US005400303A

United States Patent [19]

Tu et al.

[11] Patent Number: 5,400,303

[45] Date of Patent: Mar. 21, 1995

[54] DRIVING DEVICE FOR TIMEPIECES

[75] Inventors: Mai X. Tu, Ecublens; Michel Schwab, Bienne, both of Switzerland

[73] Assignee: Detra SA, Bienne, Switzerland

[21] Appl. No.: 52,627

[22] Filed: Apr. 27, 1993

[30] Foreign Application Priority Data

May 4, 1992 [EP] European Pat. Off. ........... 92810324

[51] Int. Cl.[6] .............................................. H02K 37/00

[52] U.S. Cl. .................................... 368/157; 368/160; 318/40; 318/49

[58] Field of Search ....................... 318/49 R, 40 MM; 368/56, 157, 160

[56] References Cited

U.S. PATENT DOCUMENTS 4,112,671 9/1978 Kato et al. .
4,563,604 1/1986 Xuan .

FOREIGN PATENT DOCUMENTS 143227 6/1985 European Pat. Off. .
940059 12/1948 France .

*Primary Examiner*—Bernard Roskoski
*Attorney, Agent, or Firm*—Oliff & Berridge

[57] ABSTRACT

The driving device comprises two single-phase stepping motors (1, 2), each having a different preferential direction of rotation. The bidirectional drive is achieved by selectively feeding one or the other of the two motors.

7 Claims, 5 Drawing Sheets

DRIVING DEVICE FOR TIMEPIECES

This invention relates to timepieces, and more particularly to a driving device for timepieces, of the type having two single-phase stepping motors engaging the same moving part, each stepping motor being made up of a magnetic circuit stator, a coil, and a permanent magnet rotor. The invention further relates to a stepping motor to be used in the foregoing device. By means of such a device, the hands of the timepiece can be turned in both directions.

The use of a bidirectional drive is advantageous when a watch is to be set electronically, for the shorter route may then be chosen for the correction.

BACKGROUND OF THE INVENTION

A bidirectional drive for the hands of a watch with the aid of a stepping motor has already been proposed. U.S. Pat. No. 4,112,671 describes a single-phase stepping motor with two directions of rotation. Control of the rotation in one direction or the other takes place by means of an electronic circuit which supplies pulses of different shapes. The main drawback of this type of drive is the narrow range of operation of the motor as regards voltage. If the rated voltage is not kept to, the steps are no longer ensured, especially for counterclockwise operation.

French Published Application No. 79 22276 discloses a two-phase stepping motor comprising a two-pole rotor and two coils, each disposed at an angle to a symmetry axis in order to subject spatially phase-shifted magnetic fields to the rotor. Although this motor offers reliable operation in both directions of rotation, its output is relatively low. The output of a micromotor depends, for one thing, on its coil volume, usually small owing to design imperatives, and for another thing, on the flux created by the magnet and coupled with the coil. The arrangement of the pole pieces in this motor means a passage surface of the magnetic flux limited to the thickness of the stator and over a sector of about 120° (FIG. 1, pole pieces 1*a* and 1*b*), which presents a reduction of about 120°/180°, or $\frac{2}{3}$, relative to the coupled flux in a single-phase motor of the same size. Hence this two-phase motor has a lower output as compared with a single-phase motor of the same size.

SUMMARY OF THE INVENTION

It is an object of this invention to provide an improved bidirectional driving device for timepieces which overcomes the aforementioned drawbacks, having a wide range of operation as regards voltage in both directions and high power output.

To this end, in the driving device according to the present invention, of the type initially mentioned, each of the stepping motors is arranged to provide a preferential direction of rotation, and the preferential directions of rotation of the motors are opposite.

In the stepping motor according to the present invention, the toothing of the rotor pinion is oriented with respect to the magnetic axis of the magnet of the rotor.

BRIEF DESCRIPTION OF THE DRAWINGS

Preferred embodiments of the invention will now be described in detail with reference to the accompanying drawings, in which.

DETAILED DESCRIPTION OF PREFERRED EMBODIMENTS

Figure 1:
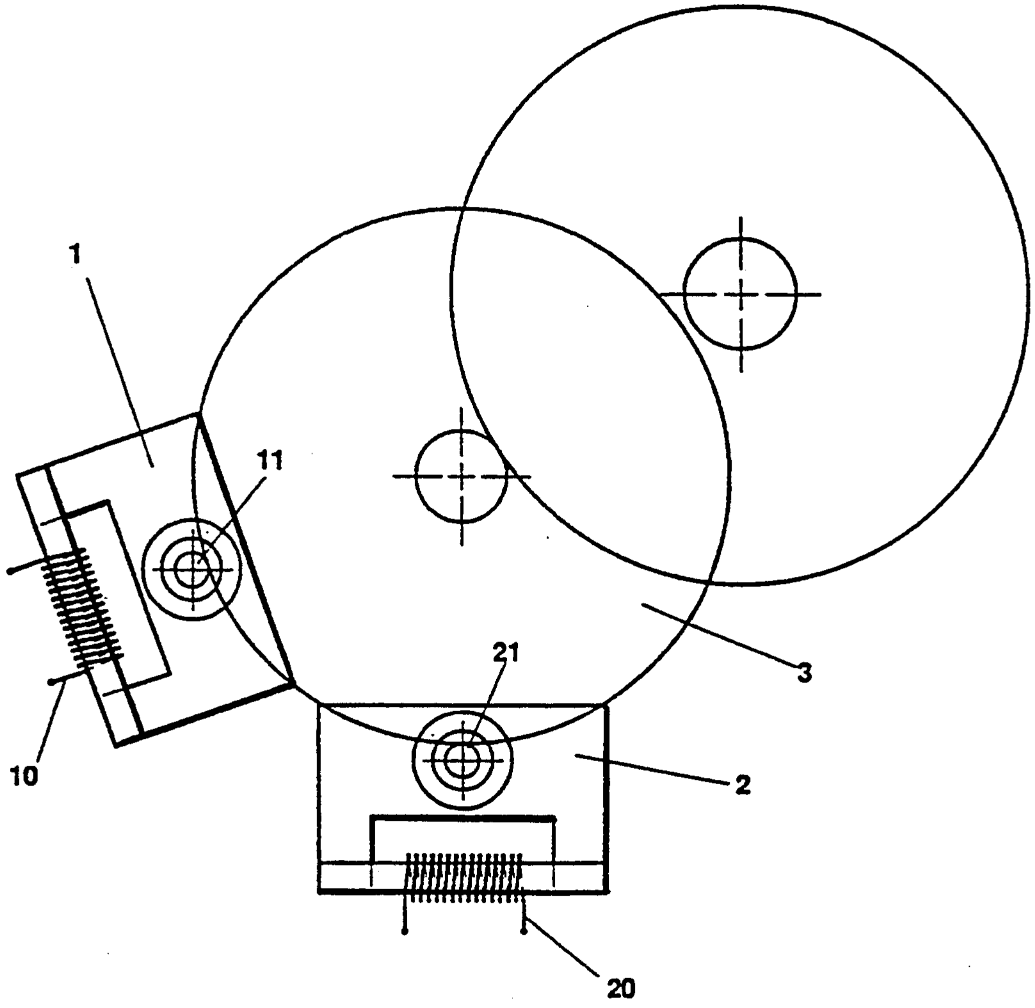
FIG. 1 is a diagrammatic top plan view of the driving device in a first embodiment of the invention.

A driving device in a first embodiment of the invention is illustrated diagrammatically in FIG. 1, where stepping motors 1 and 2 engage a gearwheel 3. Motors 1 and 2 are so arranged that when at rest, in the absence of current in coils 10 and 20, no torque is exerted on rotors 11 and 21. To achieve this, the teeth of pinions 12 and 22 mounted on rotors 11 and 21 are oriented at an angle $\alpha$ with respect to the magnetic axis of the rotor magnets (cf. FIG. 5). Orientation angle $\alpha$ depends upon the number of teeth of pinions 12 and 22 and of gearwheel 3, as well as on the relative positions of rotors 11 and 21.

Figure 2:
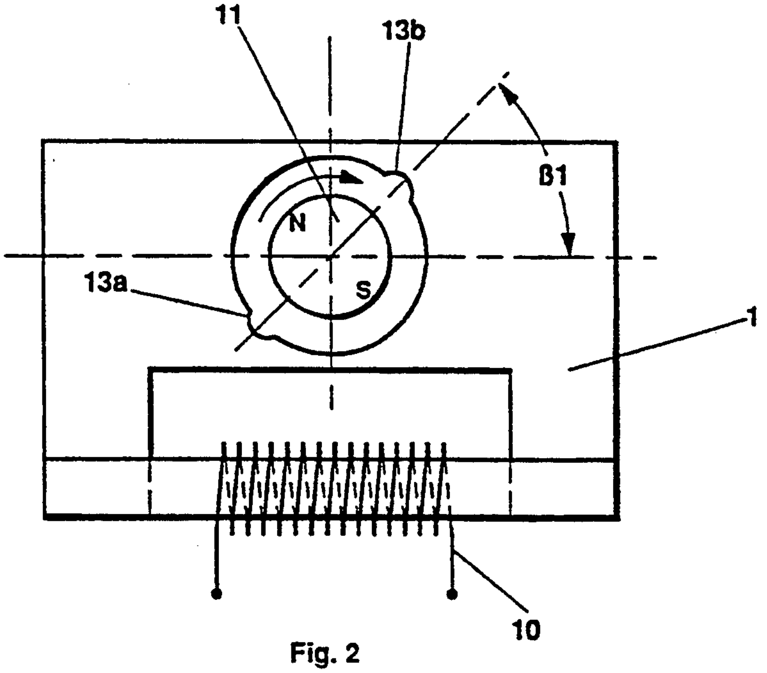
FIG. 2 is a more detailed view on a larger scale of one of the stepping motors shown in FIG. 1.
Figure 3:
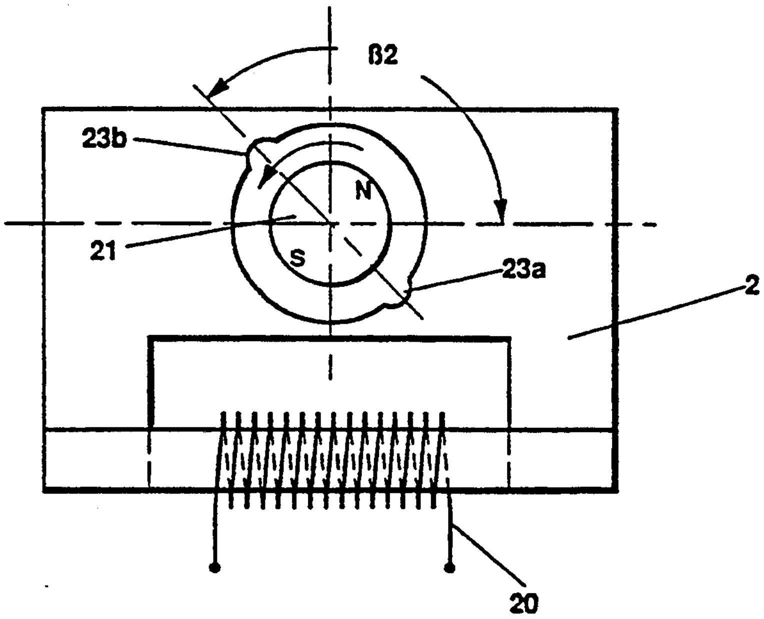
FIG. 3 is a more detailed view on a larger scale of the other stepping motor shown in FIG. 1.

As indicated in FIGS. 2 and 3, the angular positions of rotors 11 and 21 at rest are thus determined solely by positioning notches 13*a*, 13*b* and 23*a*, 23*b* in the stators of motors 1 and 2, respectively. The axes passing through these positioning notches form angles $\beta_1$ and $\beta_2$ with the horizontal axis of the mutual flux between the magnet and the coil. The asymmetrical positions of the magnets at rest give a preferential direction of rotation to each motor.

In the example illustrated in FIGS. 2 and 3, the preferential direction of rotation of motor 1 is clockwise, whereas that of motor 2 is counterclockwise. In order to control the rotation of gearwheel 3 in one direction or the other, it suffices to feed either the one motor or the other.

It is possible to increase the torque developed at the level of gearwheel 3 by feeding coils 10 and 20 with time-shifted pulses.

Figure 4:
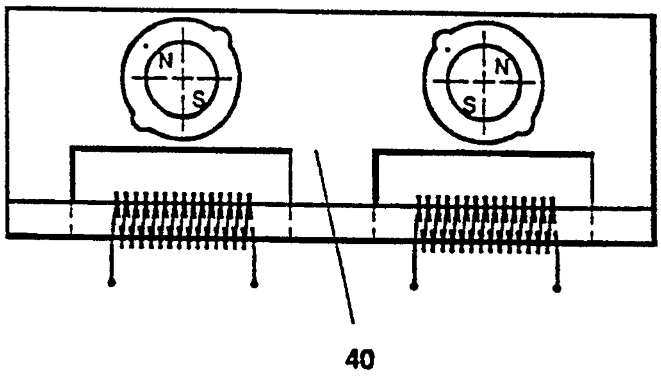
FIG. 4 is a diagrammatic top plan view of the driving device in a second embodiment of the invention.

FIG. 4 shows a driving device in a second embodiment of the invention. Here motors 1 and 2 have a common arm 40 of the magnetic circuit stator in order to make the two motors as a whole more compact. Tests in practice have shown that the use of this common arm does not cause any harmful interaction of the magnetic fluxes nor create virtually any saturation at the level of the magnetic circuit.

Figure 5:
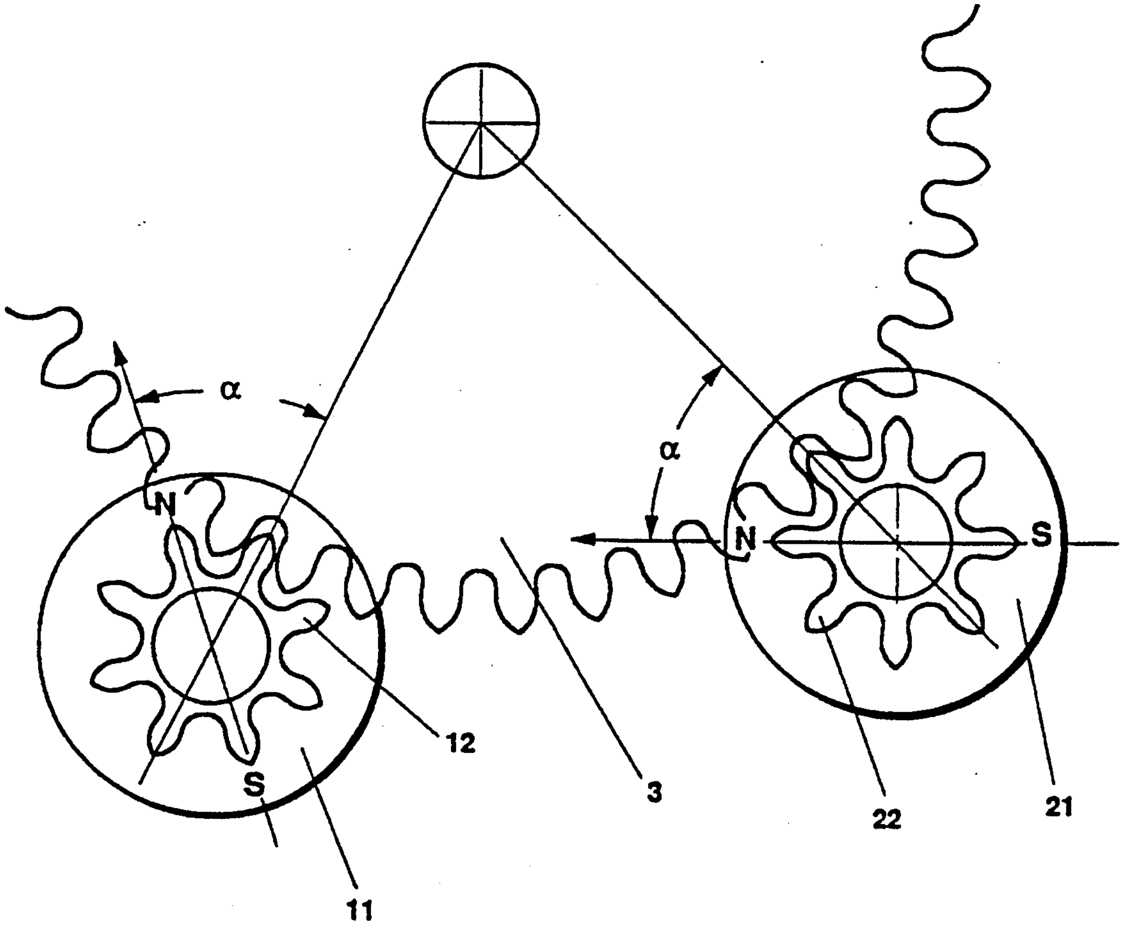
FIG. 5 is a top plan view on a larger scale showing details of the rotors of the motors of FIGS. 2, 3, and 4.

FIG. 5, a large-scale detail of rotors 11 and 21 in relation to gearwheel 3, shows particularly the aforementioned angular orientation of the teeth.

Figure 6:
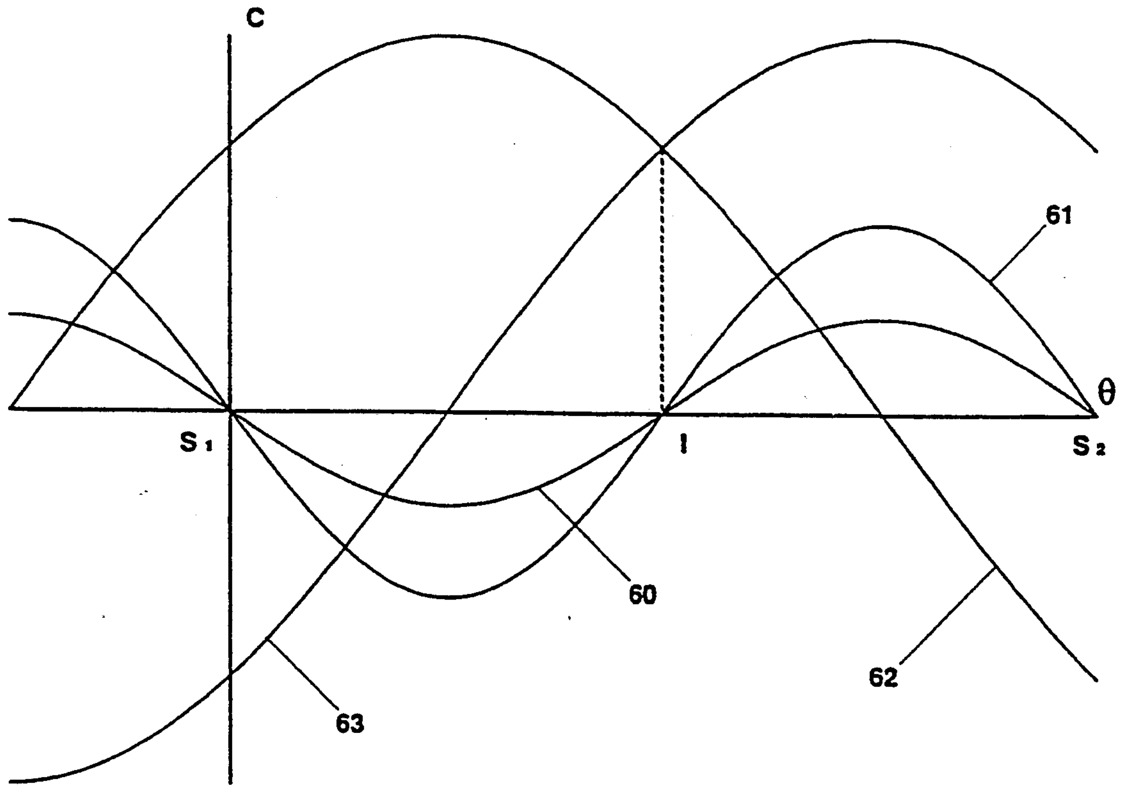
FIG. 6 is a graph showing the laws of stator torque of the motors used in the inventive driving device.

The graph of FIG. 6 indicates the laws of stator torque of the two motors as a function of the angle of rotation $\ominus$. In this graph, curve 60 represents the positioning torque of each motor taken separately, curve 61 represents the resultant positioning torque, curve 62 the mutual torque developed by motor 1, and curve 63 the mutual torque developed by motor 2. In order to pass from the point of stable equilibrium $S_1$ to point $S_2$, power is fed to coil 10, which supplies torque 62 to cause the rotor to advance to the vicinity of point I. Thereafter, the feed of coil 10 is interrupted, and coil 20 is fed since torque 63 is equal to or greater than torque 62 from this position on.

Figure 7:
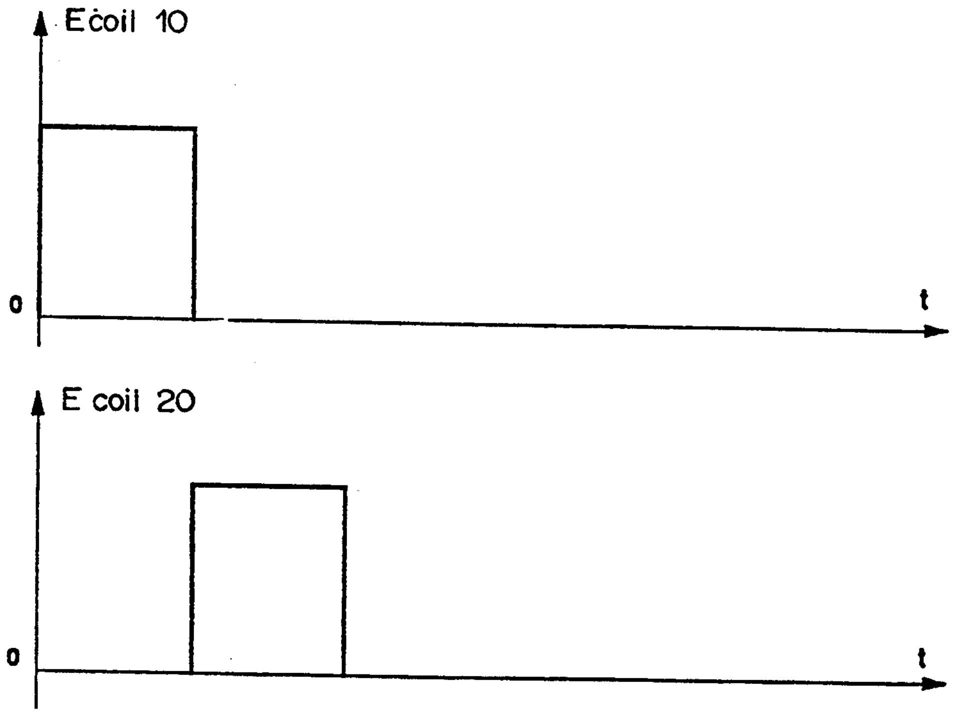
FIG. 7 is a graph showing pulses of feed voltage.

FIG. 7 shows the voltage pulses at the terminals of coils 10 and 20 as a function of time.

Figure 8:
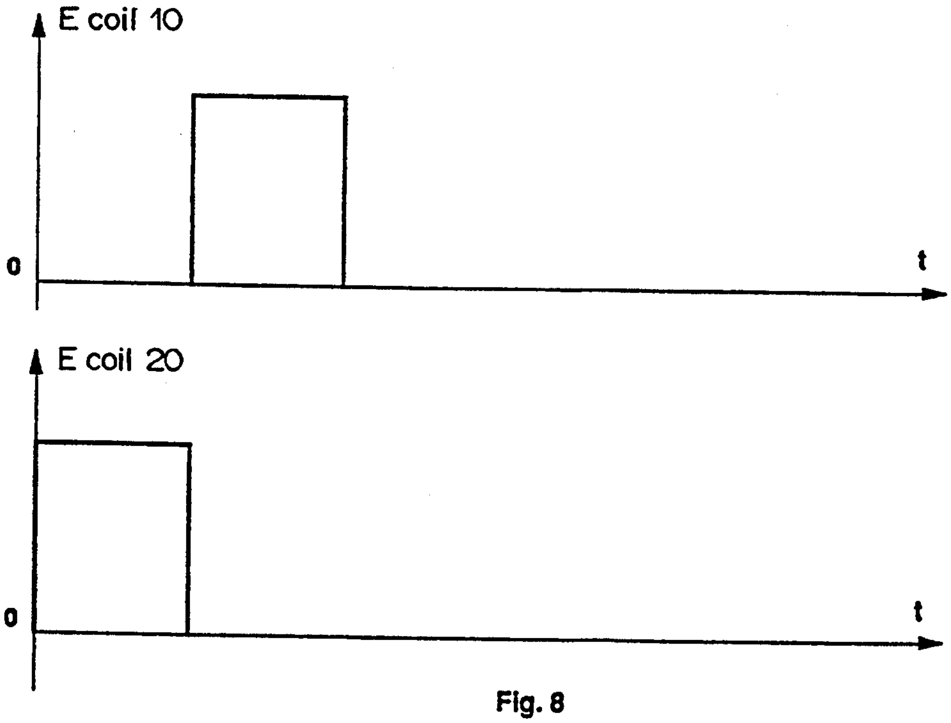
FIG. 8 is a further graph showing pulses of feed voltage.

In order to cause the motors to turn in the opposite direction, it suffices to reverse the order in which coils 10 and 20 are fed, as illustrated by FIG. 8.

What is claimed is:

1. A driving device for timepieces comprising a first single-phase stepping motor engaging a single moving part and a second single-phase stepping motor engaging said single moving part, each of said first and second motors comprising a magnetic circuit stator, a coil, and a permanent magnet rotor, the driving device further comprising means for establishing a first preferential direction of rotation for said first motor and for establishing a second preferential direction of rotation opposite said first preferential direction of rotation for said second motor, wherein each of said rotors includes a first positioning notch and a second positioning notch located at symmetrical positions with respect to each other, each of the rotors being positioned at a predetermined angle with respect to a horizontal axis of a mutual flux between the magnet and the coil, each predetermined angle being defined by an intersection of a first axis that bisects each of the rotors and intersects a center of the first and second symmetrically positioned notches and said axis of mutual flux, and wherein at least one of the following conditions exist: 1) the predetermined angle of the rotor of the first motor is an acute angle that defines the first predetermined direction of rotation as clockwise, and 2) the predetermined angle of the rotor of the second motor is an obtuse angle that defines the second predetermined direction of rotation as counterclockwise.

2. The driving device of claim 1, further comprising a magnetic circuit stator arm common to said first and second motors.

3. The driving device of claim 1, wherein each of said rotors comprises two stable positions defined by said positioning notches.

4. The driving device of claim 1, wherein each of said stepping motors is asymmetrically oriented with respect to said single moving part.

5. A motor arrangement for use in a driving device for timepieces comprising a first single-phase stepping motor engaging a single moving part and a second single-phase stepping motor engaging said single moving part, each of said first and second motors comprising a magnetic circuit stator, a coil, and a permanent magnet rotor, the motor arrangement further comprising means for establishing a first preferential direction of rotation for said first motor and for establishing a second preferential direction of rotation opposite said first preferential direction of rotation for said second motor, wherein each of said rotors comprises a pinion having teeth oriented with respect to a magnetic axis of the magnet of each of said rotors, wherein each of said rotors includes a first positioning notch and a second positioning notch located at symmetrical positions with respect to each other, each of the rotors being positioned at a predetermined angle with respect to a horizontal axis of a mutual flux between the magnet and the coil, each predetermined angle being defined by an intersection of a first axis that bisects each of the rotors and intersects a center of the first and second symmetrically positioned notches and said axis of mutual flux, and wherein at least one of the following conditions exist: 1) the predetermined angle of the rotor of the first motor is an acute angle that defines the first predetermined direction of rotation as clockwise, and 2) the predetermined angle of the rotor of the second motor is an obtuse angle that defines the second predetermined direction of rotation as counterclockwise.

6. The single-phase stepping motor of claim 5, further comprising a magnetic circuit stator arm common to said first and second motors.

7. The driving device of claim 5, wherein each of said rotors comprises two stable positions defined by said positioning notches.

* * * * *